US007736221B2

(12) United States Patent
Black et al.

(10) Patent No.: US 7,736,221 B2

(45) Date of Patent: Jun. 15, 2010

(54) POKER ONLINE PLAYING SYSTEM

(75) Inventors: Adam Matthew Black, Maineville, OH (US); Gerald R. Black, Southfield, MI (US)

(73) Assignee: Pen-One, Inc., Southfield, MI (US)

( * ) Notice: Subject to any disclaimer, the term of this patent is extended or adjusted under 35 U.S.C. 154(b) by 1341 days.

(21) Appl. No.: 11/122,888

(22) Filed: May 6, 2005

(65) Prior Publication Data

US 2006/0154715 A1 Jul. 13, 2006

Related U.S. Application Data

(60) Provisional application No. 60/642,402, filed on Jan. 10, 2005.

(51) Int. Cl.
*G06F 17/00* (2006.01)
*G06F 19/00* (2006.01)

(52) U.S. Cl. ............................ 463/13; 463/11; 463/12; 463/25; 463/26; 463/28; 463/29; 463/40; 463/41; 463/42; 273/292

(58) Field of Classification Search ............ 463/11–13, 463/26, 28, 40–42; 273/292
See application file for complete search history.

(56) References Cited

U.S. PATENT DOCUMENTS

| | | | | | |
|---|---|---|---|---|---|
| 4,467,424 | A | * | 8/1984 | Hedges et al. | 463/26 |
| 5,382,025 | A | * | 1/1995 | Sklansky et al. | 273/292 |
| 5,687,968 | A | * | 11/1997 | Tarantino | 273/139 |
| 5,762,552 | A | * | 6/1998 | Vuong et al. | 463/25 |
| 5,770,533 | A | * | 6/1998 | Franchi | 463/42 |
| 5,800,268 | A | * | 9/1998 | Molnick | 463/40 |
| 5,830,067 | A | * | 11/1998 | Graves et al. | 463/40 |
| 5,830,068 | A | * | 11/1998 | Brenner et al. | 463/42 |
| 5,839,731 | A | * | 11/1998 | Feola | 273/292 |
| 5,871,213 | A | * | 2/1999 | Chadband et al. | 273/292 |
| 6,120,376 | A | * | 9/2000 | Cherry | 463/16 |
| 6,299,533 | B1 | * | 10/2001 | Parra et al. | 463/17 |
| 6,450,887 | B1 | * | 9/2002 | Mir et al. | 463/42 |
| 6,508,709 | B1 | * | 1/2003 | Karmarkar | 463/42 |
| 6,511,068 | B1 | * | 1/2003 | Sklansky et al. | 273/237 |
| 6,679,777 | B2 | * | 1/2004 | Pfeiffer et al. | 463/42 |
| 6,695,695 | B2 | * | 2/2004 | Angel | 463/13 |

(Continued)

*Primary Examiner*—Peter DungBa Vo
*Assistant Examiner*—Milap Shah
(74) *Attorney, Agent, or Firm*—MacCord Mason PLLC

(57) ABSTRACT

The online poker gaming system comprises a live or recorded poker game, and at least one gaming terminal. The live or recorded poker game involves a group of players sitting around a table. Each player is playing for prize money so there is a cash incentive for each to win. The player terminal displays images of the live or recorded game being broadcast for view by an online player. The player terminal also includes a schematic of the game for presenting in a concise and visual way, the game status and gaming data of the live or recorded game. The player terminal also includes a keypad, enabling the online player to select one or more players to win, and select a value for each selection. So while the online player cannot make gaming decisions—fold, call, check, and raise—the online player can participate by making selections, much as one would make selections at a racetrack. The online player can make multiple playing selections unavailable to the player sitting at the table.

14 Claims, 17 Drawing Sheets

Select Winning Player

U.S. PATENT DOCUMENTS

| | | | | |
|---|---|---|---|---|
| 6,929,264 | B2 * | 8/2005 | Huard et al. | 273/274 |
| 7,516,959 | B2 * | 4/2009 | Huard et al. | 273/274 |
| 2002/0058548 | A1 * | 5/2002 | Stronach | 463/25 |
| 2002/0103028 | A1 * | 8/2002 | Carter et al. | 463/42 |
| 2003/0195043 | A1 * | 10/2003 | Shinners et al. | 463/42 |
| 2003/0220143 | A1 * | 11/2003 | Shteyn et al. | 463/42 |
| 2004/0009812 | A1 * | 1/2004 | Scott et al. | 463/28 |
| 2004/0198483 | A1 * | 10/2004 | Amaitis et al. | 463/16 |
| 2004/0235542 | A1 * | 11/2004 | Stronach et al. | 463/6 |
| 2005/0227757 | A1 * | 10/2005 | Simon | 463/25 |
| 2006/0217167 | A1 * | 9/2006 | Jubinville et al. | 463/13 |
| 2006/0223605 | A1 * | 10/2006 | Pullman | 463/16 |
| 2006/0252520 | A1 * | 11/2006 | Platis | 463/28 |
| 2006/0258438 | A1 * | 11/2006 | Platis | 463/25 |

* cited by examiner

Player Station

Select Winning Player

Select Winning Player

*Select Winning Player*

Select Best Cards

Select Best Cards

Select Best Cards

Select Winning Player/Best Cards

Poker Online Play

Local Online
Play Network System

Remote Online
Play Network System

*Texas Hold'em Basic Strategy*

POKER ONLINE PLAYING SYSTEM

This Application claims priority from U.S. Provisional Application 60/642,402, entitled "Poker Online Playing System," filed on Jan. 10, 2005, and U.S. patent application Ser. No. 10/930,246, entitled "Off-Site Casino Play," filed on Sep. 1, 2004.

FIELD OF USE

The gaming system of the present invention enables an online player to enjoy quality play at any game within the casino complex, at any time, and from any location. The system enables the online player to select any player at a poker table and participate from a remote location.

BACKGROUND OF THE INVENTION

While there are many poker-type games that can be played on the Internet, practically all of them offer the same wagering options, and many of them are canned or preprogrammed. As racetracks have expanded their reach with off-track betting, casinos can dramatically increase revenues by enabling play online. While wagers can be placed on horse races in various racetracks around the country and the world online and in real time, such system are not available for other live play in the casino. U.S. Pat. No. 5,762,552 (Vuong) discloses a network based gaming system that enables a plurality of players to place wagers on a real-time game of chance being conducted in a casino via a distributed network system or, alternatively, to place wagers on a game of chance using internally generated game sequences. In the preferred embodiment of the system, a gaming machine provides a menu of a plurality of live-action board games of chance, such as roulette, craps or baccarat.

Many people enjoy poker but lack the skill or the bankroll to play in a high-profile game. Some people are uncomfortable in a crowded casino, particularly, alone prime time in the bigger casinos. The air is smoke-filled, heavy drinking is common, the crowds are shoulder to shoulder, people become separated, and space at gaming tables is rare.

Once gaming information is captured on current gaming activity, quality online play becomes a reality. Each online player directly enters his playing decisions (hi/lo, winning player or best cards, player, value) into the gaming computer through a keypad. Once the hand is completed, the gaming computer knows all relevant information about the game in progress. This information is used to provide the online player with historical information about the players and the game.

Poker is now the most popular card game because of television. On almost any evening, there is at least one poker tournament on cable television—usually "No-Limit Texas Hold'em." In the No-Limit version of Texas Hold'em, any participating player can wager any portion of his chips at any time. There is also a Limit version of Texas Hold'em, where there are limits to the amount of the wager. The use of windows and cameras located in front of each player enables the game to be broadcast and the home viewer can watch each player as the cards are dealt each round.

Texas Hold'em is the most popular form of casino poker. It has been popularized by televised poker contests such as the World Poker Tour and the World Series of Poker, which have brought many new players to the game. Texas Hold'em is easy to learn, but it boasts intricate strategy and requires practice, skill and cunning to play well. Yet, the lower limits of the game are forgiving enough to new players, and with a plethora of online poker rooms, it is very easy to learn and practice the game while wagering little or no money. Texas Hold'em is a community card game. Every player is dealt two cards face down, and then five community cards are dealt in the middle of the table. The five community cards may be used by every player.

A Texas Hold'em poker game proceeds as follows:

The betting structure can vary, but most games start with two players placing out a predetermined amount of money so there is an initial amount to play for, which is referred to as "blinds." These players are the two to the left of the dealer, and the deal rotates clockwise after each hand. The dealer shuffles from a complete deck of 52 playing cards. Each player is dealt two cards face down (the pocket). There is then an initial round of betting starting with the player to the left of the two who posted the blinds. The amount bet depends on what kind of game it is. Much like most games of poker, players can call, check, raise, or fold. The dealer then deals three cards face up. These are community cards that anyone can use in combination with his two pocket cards to form a poker hand. There is another round of betting starting with the player to the left of the dealer. After the betting concludes, the dealer flips one more card onto the table. Players can use this sixth card now to form a five-card poker hand. The player to the left of the dealer begins another round of betting. Finally, the dealer places a final card face up on the table. Players can now use any of the five cards on the table or the two cards in their pocket to form a five-card poker hand. There is one final round of betting starting with the player to the left of the dealer. Then, all of the players remaining in the game begin to reveal their hands. The player who shows the best hand wins!

SUMMARY OF THE INVENTION

The system of the present invention enables any player in the world with a television or an Internet terminal to sit alongside a poker superstar and place a small wager with them. This is in contrast to existing Internet sites that provide simulated and preprogrammed play. Participating casinos can dramatically increase revenues by reaching players located throughout the world.

The system of the present invention enables any guest within the hotel complex to participate through Intranet terminals located in guest rooms, suites, lounges, and restaurants to participate in any live or recorded game at any time.

The system of the present invention provides players with a quality online play option that is comparable to live play at the gaming tables, and for some players is actually preferred. The online player is able to move from player to player, from table to table, and from game to game without leaving the playing terminal.

The system of the present invention enables the online player to select any player in the casino and wager on the outcome of the on-site player at the gaming table. The system can be used in any casino-type game (blackjack, poker, baccarat, craps, roulette, and slot machines).

In the first preferred embodiment of the online poker gaming system of the present invention, the gaming system comprises a live poker game, and at least one gaming terminal.

The live or recorded game of poker involves a group of players sitting around a table. The game is essentially a conventional game, whereby the players have fold, call, check, and raise playing options. Each player is playing for prize money so there is a cash incentive for each to do well.

The player terminal displays images of the live or recorded game being broadcast for view by a player. The player terminal also includes a schematic of the game for presenting in a visual, of pertinent gaming data and game status. The player terminal also includes a keypad, enabling the online player to select one or more players to win; either a hand, the tournament, or both. The online player also selects a value for each selection.

So while the online player cannot make gaming decisions—fold, call, check, and raise—the online player can participate by making selections, much as one would make selections at a racetrack. The online player can make multiple playing selections unavailable to the player sitting at the table. The online player can move from player to player, or even to another table. The online player wins whenever the player selected wins.

In another preferred embodiment of the online poker gaming system of the present invention, the online player can select which player receives the best cards (rather than the winning player). There is a certain frustration in these games for viewers when the player sitting at the table with the best cards folds. This embodiment enables the online player to win in those instances.

In still another preferred embodiment of the online poker gaming system of the present invention, a portion of each pot is set aside. When several online players are involved, the online player who makes the best selections wins this pot.

In yet another preferred embodiment of the poker gaming system of the present invention, the players at the table are committed to use basic poker strategy, which limits bluffing and also massive betting (all-in). This embodiment on also be used as a teaching tool for the online player.

For purposes of illustration only this specification is directed at Texas Hold'em. However it is understood that the principles set forth herein will enable one skilled in the art to be used in other poker games or even in other games of chance. As used herein a "game" refers to a poker hand, where each participating player is dealt two cards and then betting then occurs as the community cards are turned over. A "tournament" refers to a series of games where a winner is determined.

For a complete understanding of the online gaming system of the present invention, reference is made to the following summary of the invention detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention.

DETAILED DESCRIPTION OF THE DRAWINGS

Figure 1:
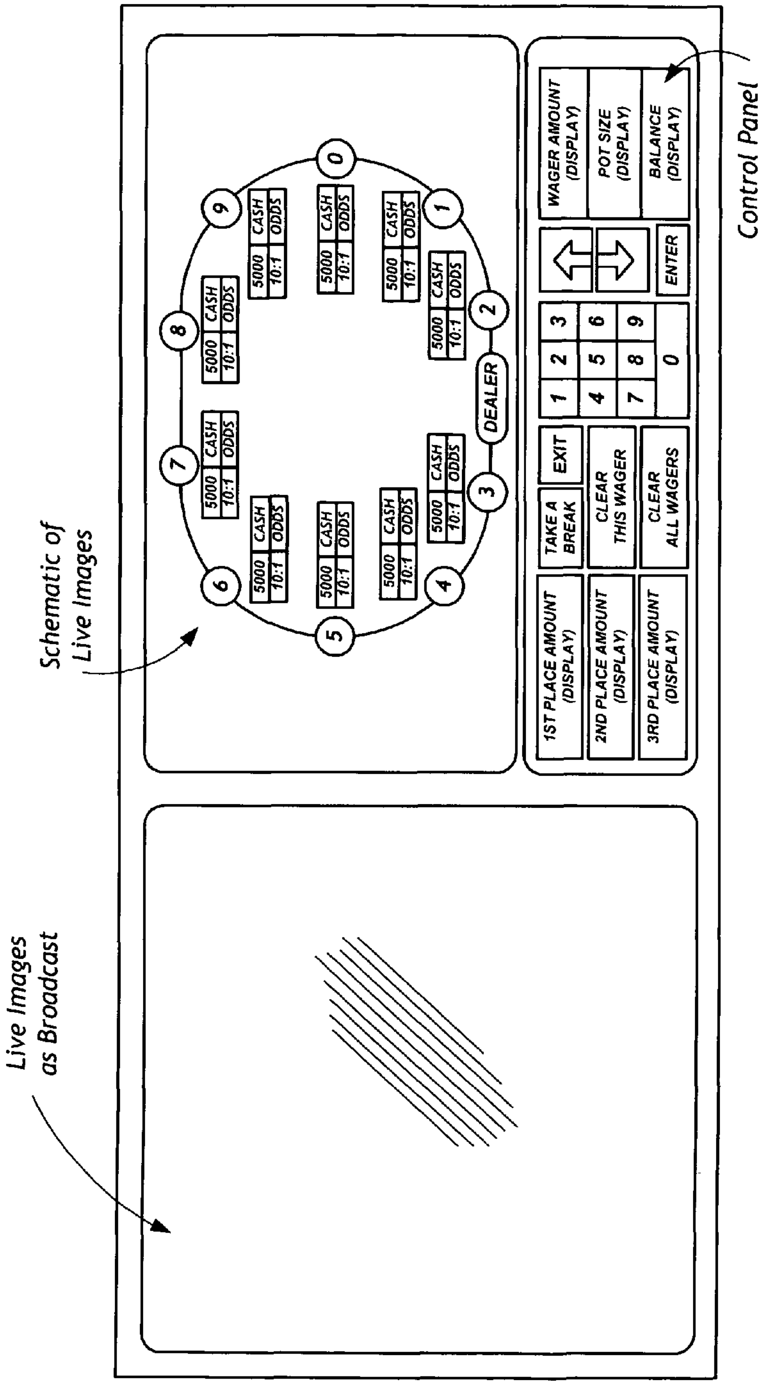
FIG. 1 discloses the preferred embodiment of a player station for use in the online poker gaming system of the present invention, comprising a television monitor for viewing the live broadcast, a schematic showing the table and the players with game status and gaming data, and a keypad.
Figure 2:
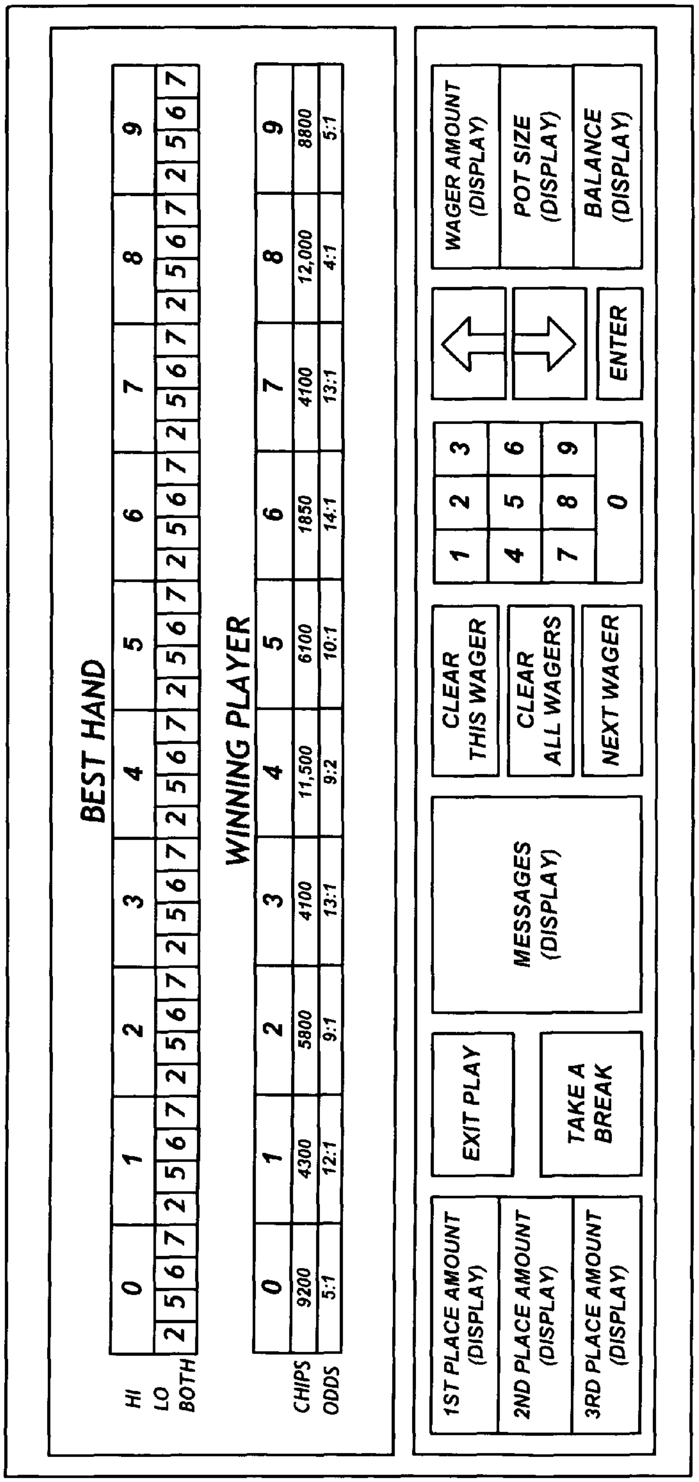
FIG. 2 discloses a simplified screen for an online player to select the winner of the tournament, once several hands have been played.
Figure 3A:
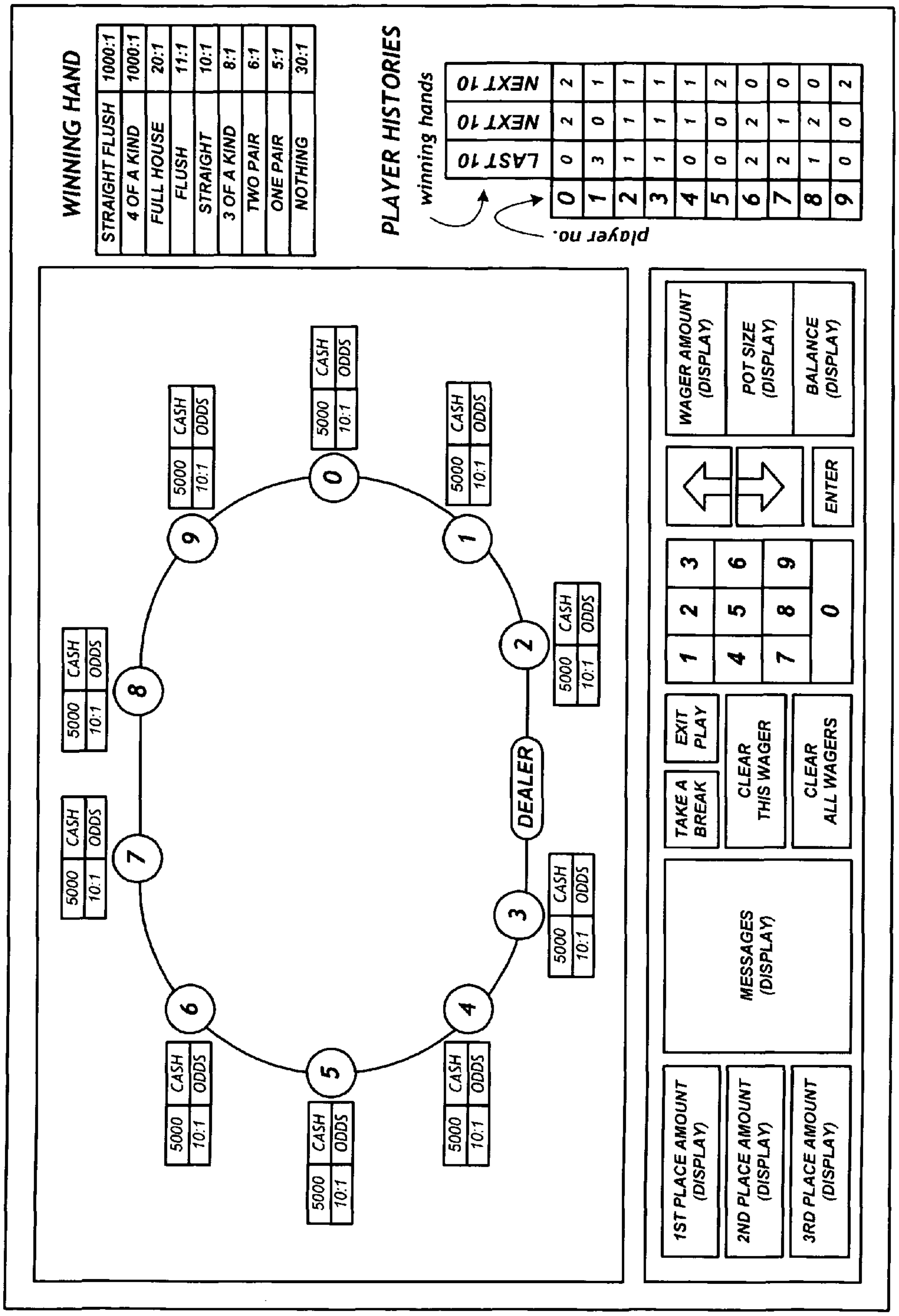
FIG. 3A discloses an enlarged table schematic and keypad for the preferred embodiment of the player station of FIG. 1, of the game schematic whereby the online player can select which of the ten players playing at the table will be the winner of the current hand that enables the online player to select a player who will win the current hand, the schematic showing the odds for each player, and the amount of his cash.
Figure 3B:
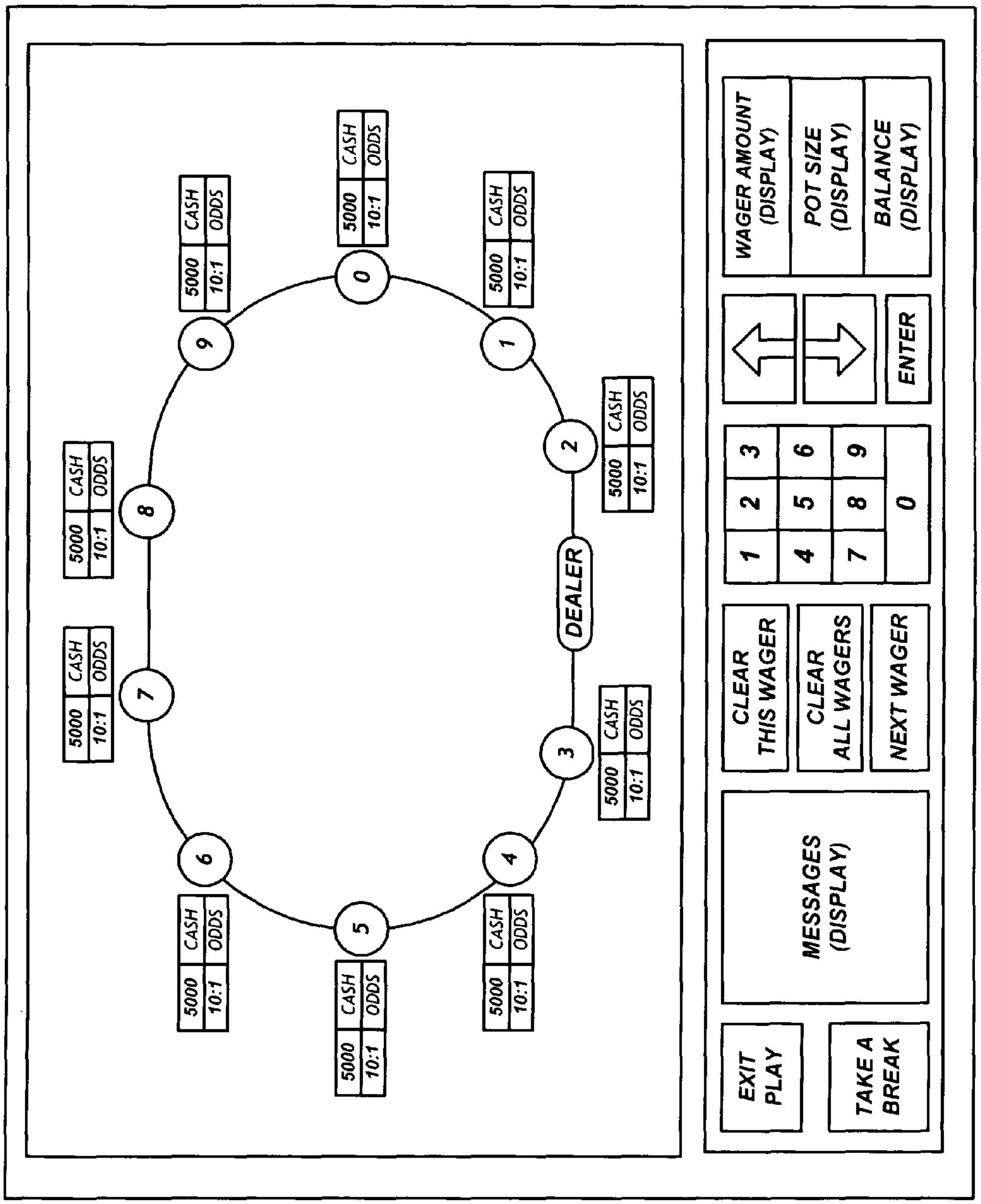
FIG. 3B discloses an enlarged table schematic and keypad for the preferred embodiment of the player station of FIG. 1, and yet another preferred embodiment of the game schematic whereby the online player can select which of the ten players playing at the table will be the winner of the current hand, playing HI-LO.
Figure 3C:
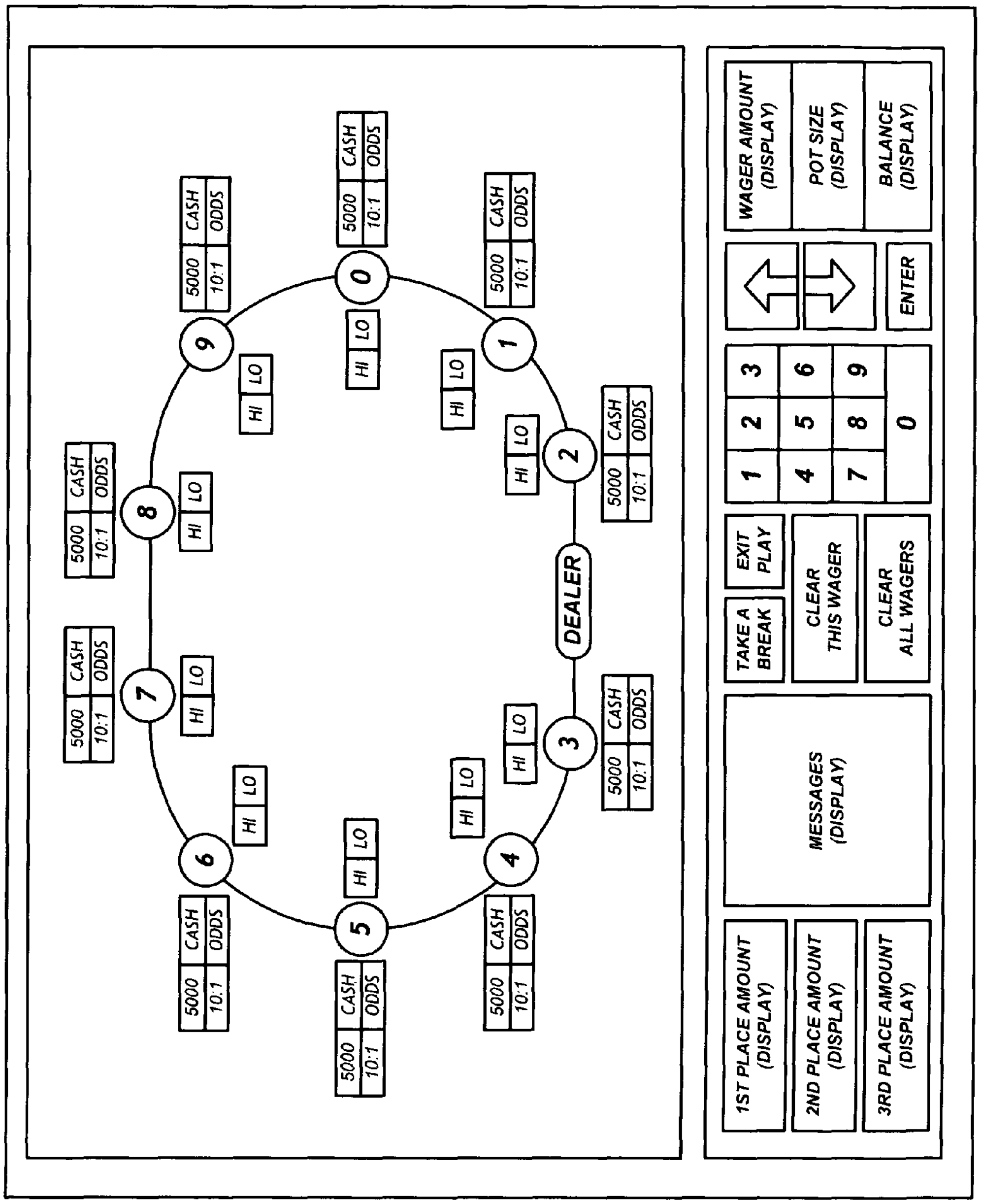
FIG. 3C discloses an enlarged table schematic and keypad for the preferred embodiment of the player station of FIG. 1, of the game schematic whereby the online player can select which of the ten players playing at the table will be the winner of the current hand.
Figure 3D:
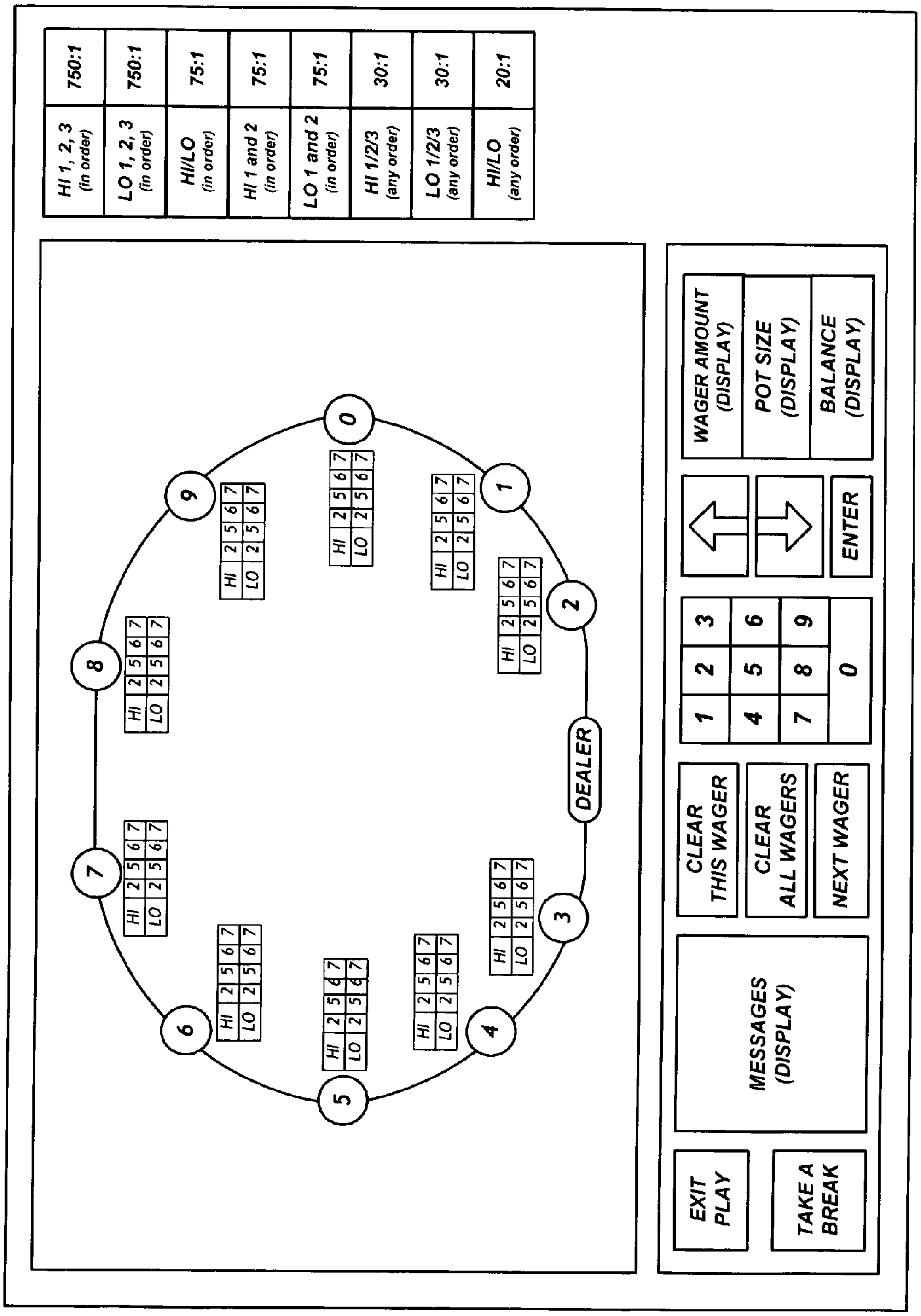
FIG. 3D discloses an enlarged table schematic and keypad for the preferred embodiment of the player station of FIG. 1, and a preferred embodiment of the game schematic whereby the online player can select which of the ten players playing at the table will be dealt the best cards in the current hand, playing HI-LO.
Figure 3E:
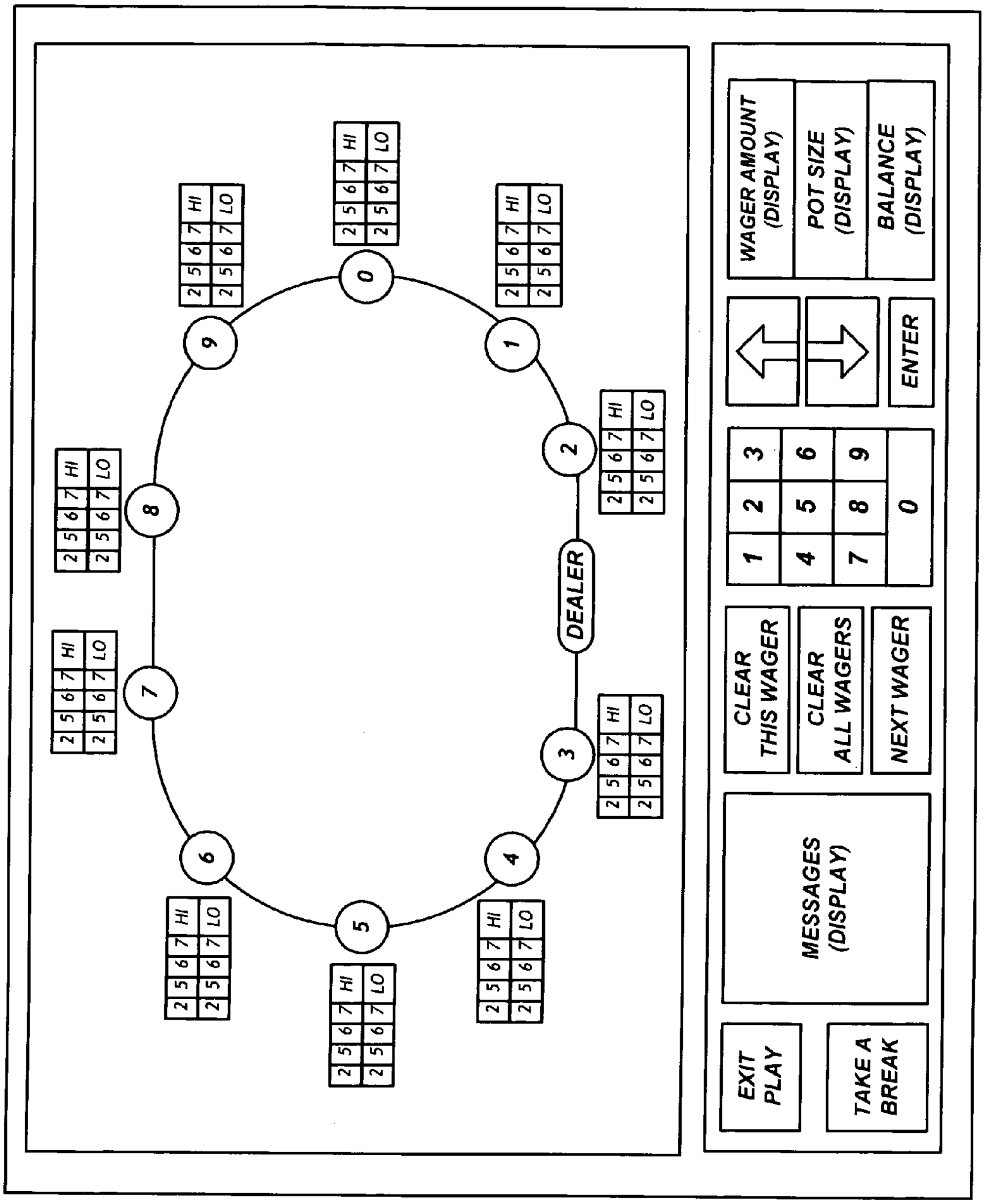
FIG. 3E discloses an enlarged table schematic and keypad for the preferred embodiment of the player station of FIG. 1, and another preferred embodiment of the game schematic whereby the online player can select which of the ten players playing at the table wilt be dealt the best cards in the current hand, playing HI-LO.
Figure 3F:
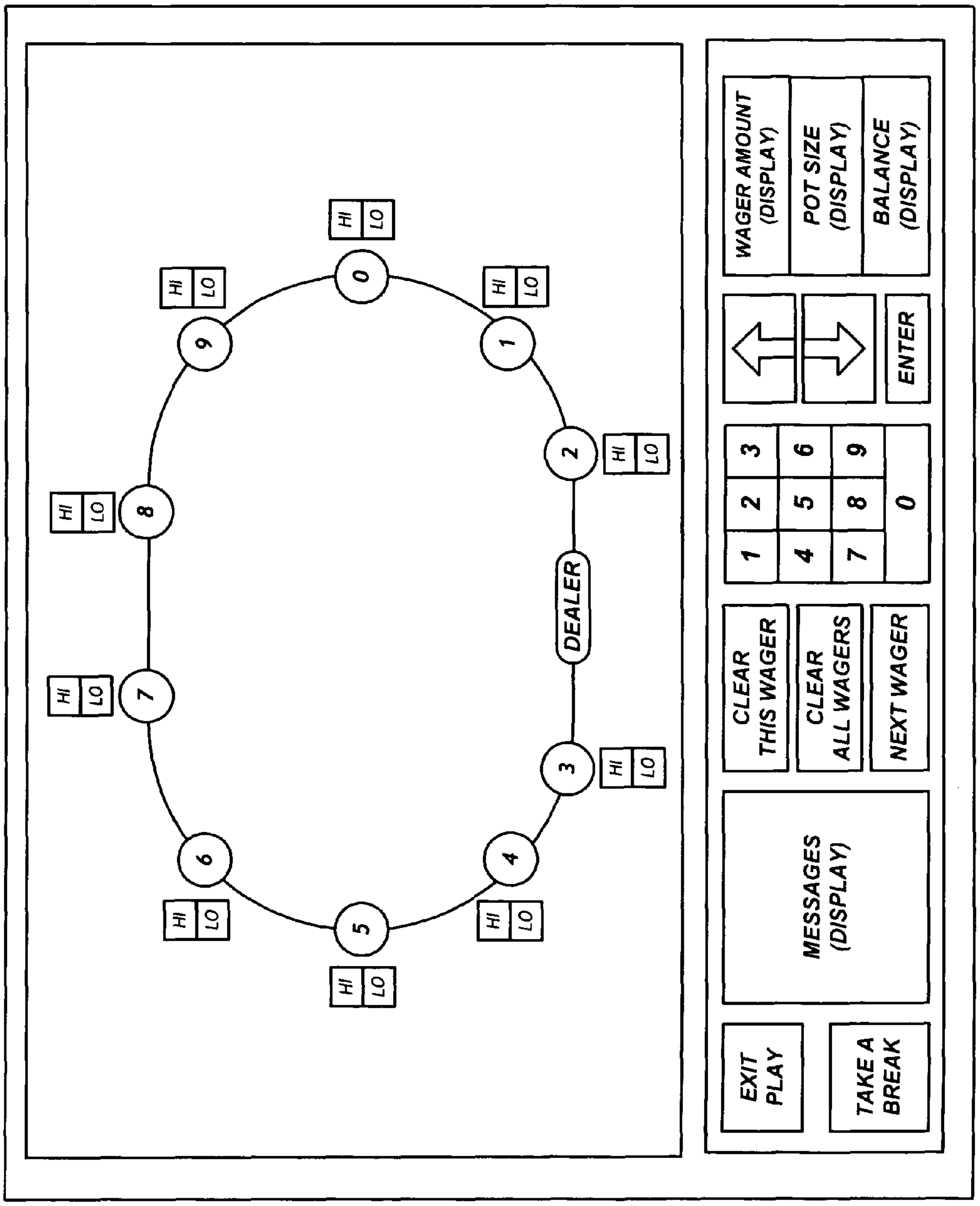
FIG. 3F discloses an enlarged table schematic and keypad for the preferred embodiment of the player station of FIG. 1, and another preferred embodiment of the game schematic whereby the online player can select which of the ten players playing at the table will be dealt the best cards in the current hand, playing HI-LO.
Figure 3G:
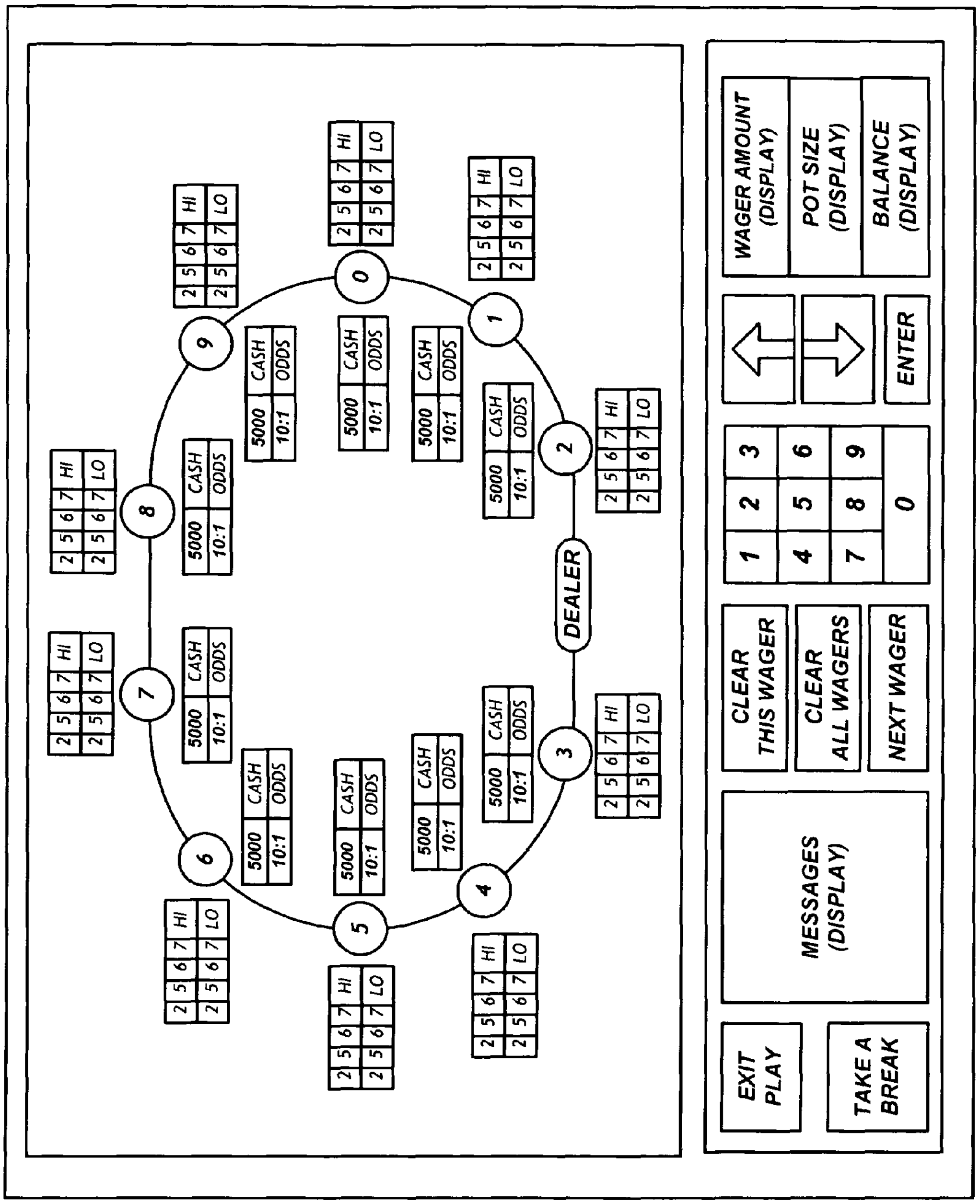
FIG. 3G discloses an enlarged table schematic and keypad for the preferred embodiment of the player station of FIG. 1, and still yet another preferred embodiment of the game schematic whereby the online player can select which of the ten players playing at the table will be the winner of the current hand, and also which player will be dealt the best cards.
Figure 4:
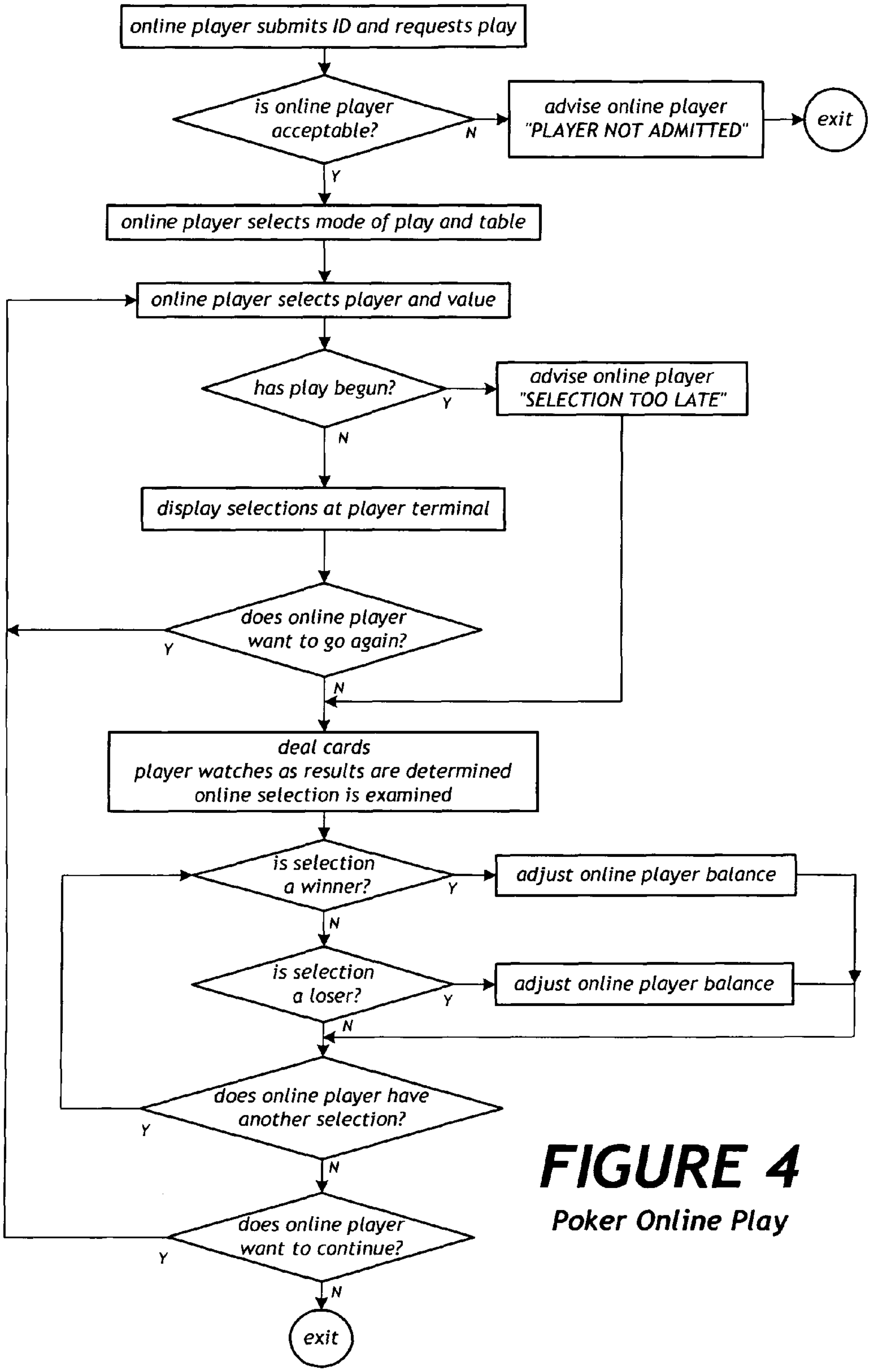
FIG. 4 discloses a simplified schematic of a logic diagram for the online playing system of the present invention, whereby the online player can select the type of game to view, and the type of selections for gaming.
Figure 5A:
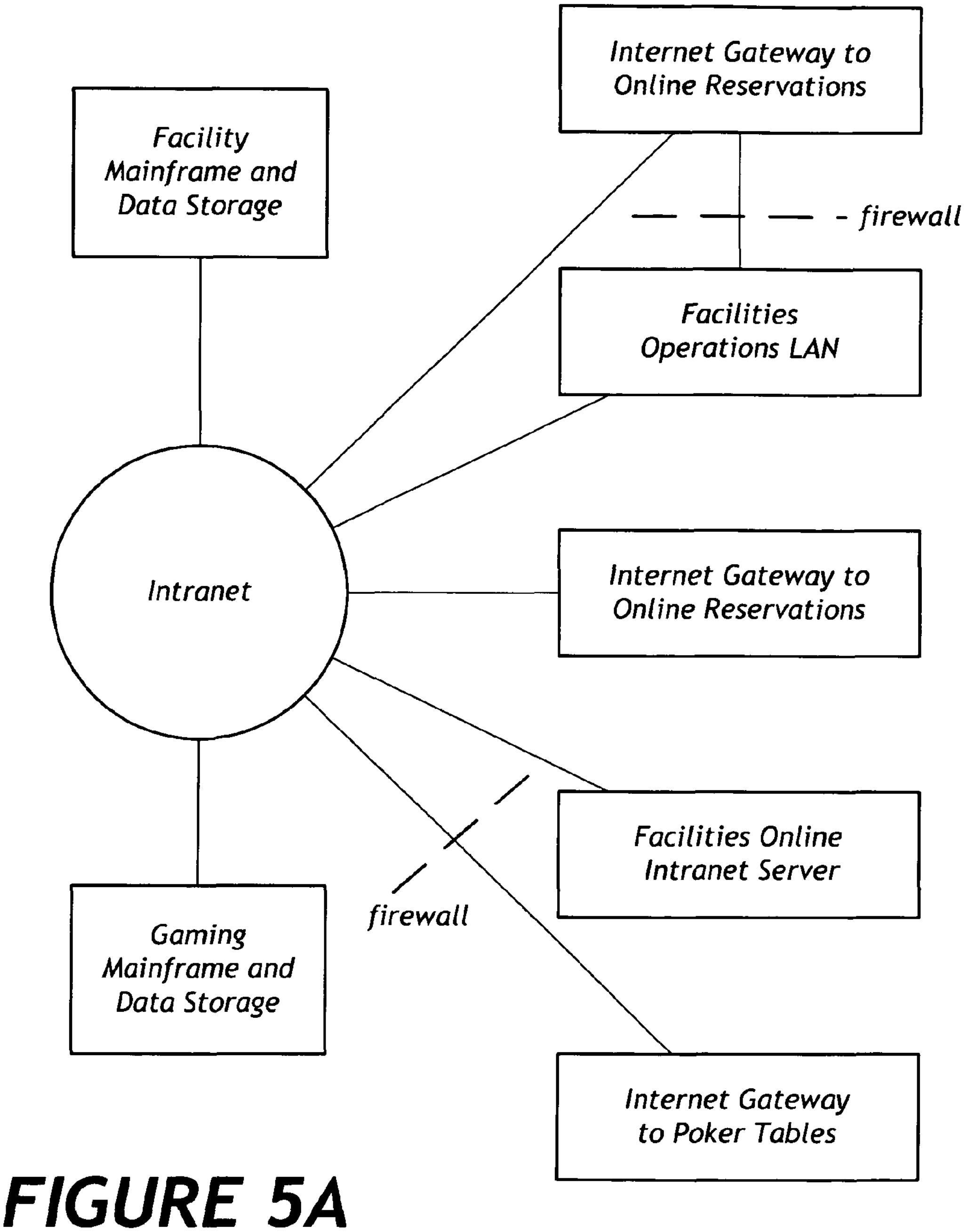
FIG. 5A is a block diagram of the preferred embodiment of the online gaming system of the present invention.
Figure 5B:
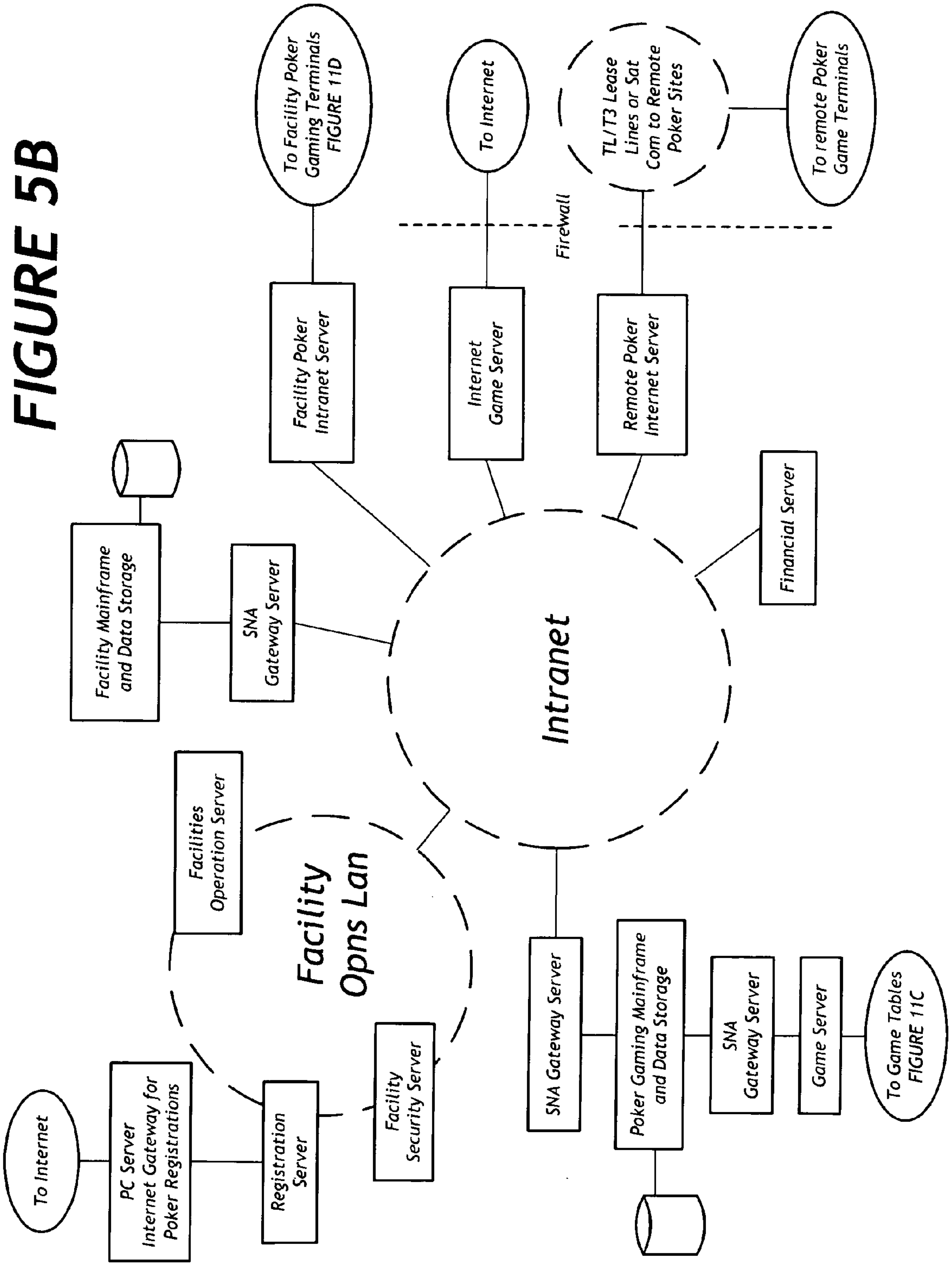
FIG. 5B is a hardware schematic of the main facility network including the online gaming system of FIG. 5A.
Figure 5C:
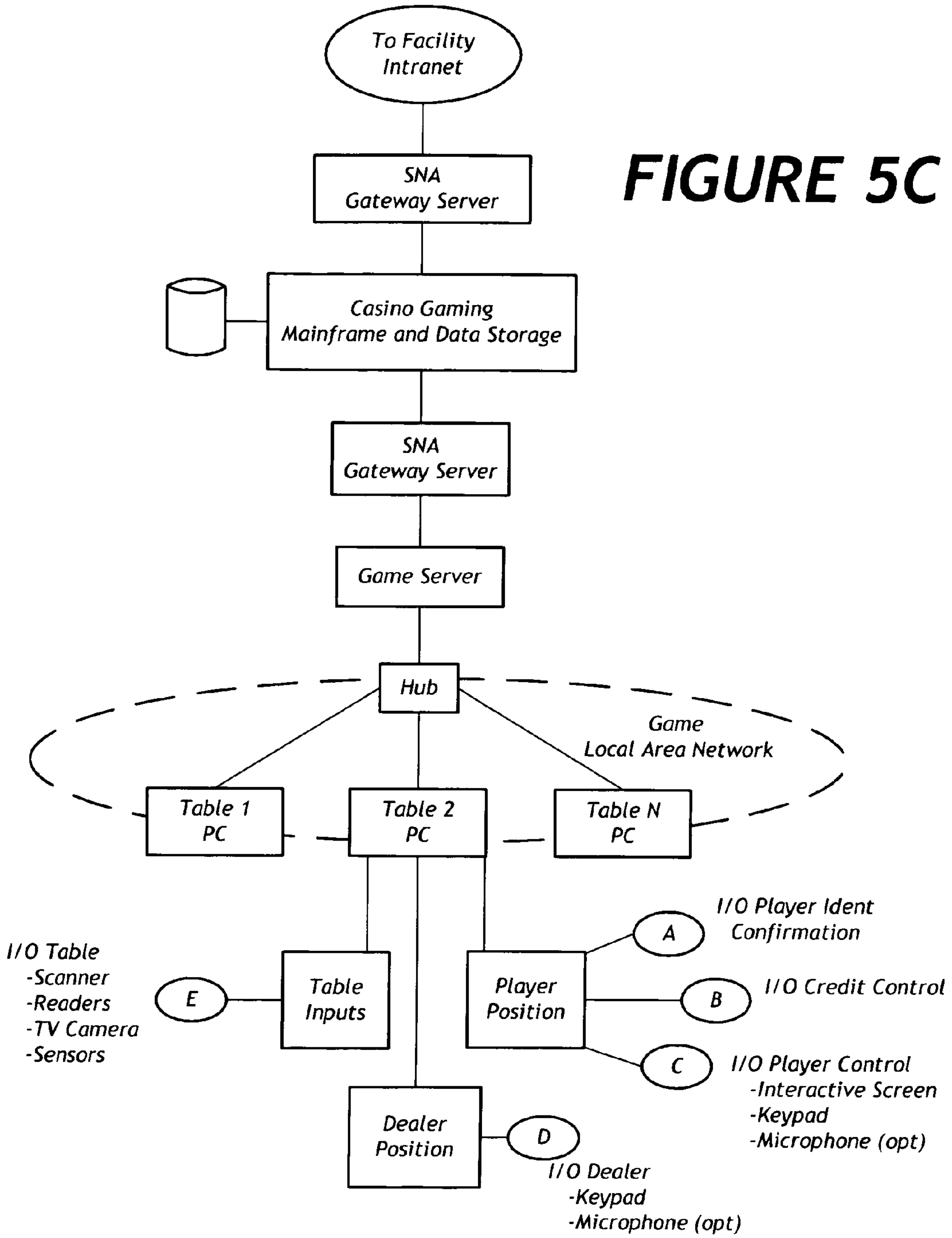
FIG. 5C is a hardware schematic of a typical gaming system for poker play for the casino gambling system of FIG. 5B.
Figure 5D:
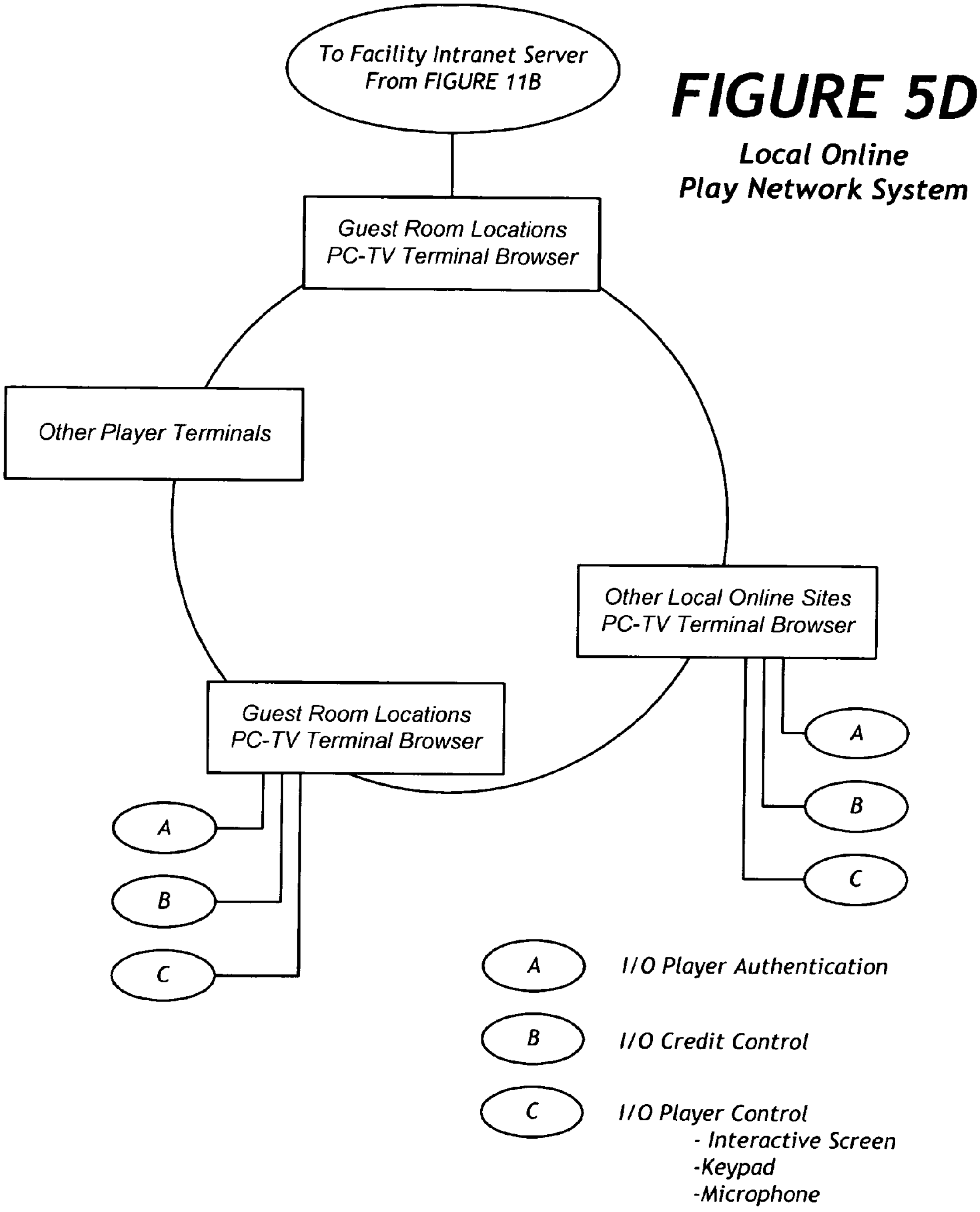
FIG. 5D is a hardware schematic of a local online play network for the online gaming system of FIG. 5B.
Figure 5E:
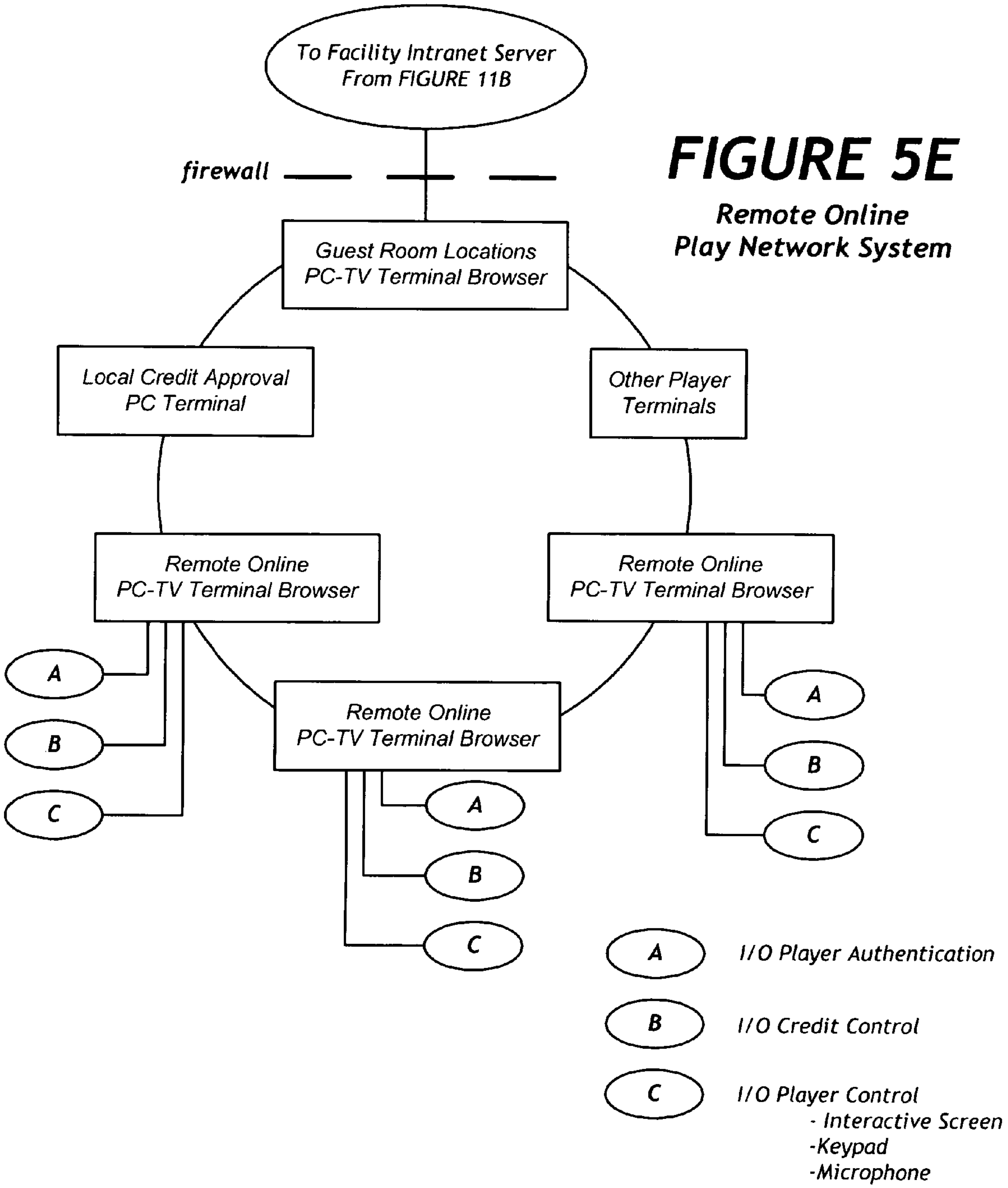
FIG. 5E is a block diagram of remote online play network accessed through Leased lines or satellite communications for the casino gambling system of FIG. 5B.

Referring now to the drawings, FIG. 1 discloses the playing terminal for the online gaming system of the present invention—which comprises a live or recorded game of poker and a player terminal.

In one preferred embodiment of the system of the present invention, the game of poker is a live game, actually taking place in real time. This embodiment ensures that none of the online players know the results of any game, round, or tournament.

In another preferred embodiment of the system of the present invention, the game of poker is recorded. The primary advantage here is that the game moves faster, since there are no breaks in the action. In this embodiment, care must be taken that none of the gaming results are known by any of the online players.

Whether the poker game is live or recorded, multiple tables are made available to the online player, play at multiple tables are made available to the online player, to increase gaming options, to minimize downtime during breaks, to enable an online player to monitor and participate in gaming activity at more than one table.

The live or recorded game of poker involves a plurality of participating players. The participating players are positioned about a poker table. The participating players have conventional fold, call, check, and raise playing options. The participating players use their best gaming skills to win each hand of poker.

In the preferred embodiment of the present invention as shown in FIG. 1, the player terminal includes a television receiver for viewing a live broadcast combined with a computer terminal. The screen of the computer terminal displays a schematic of the live or recorded game being viewed on the receiver, and the computer keypad enables an online player to make selections relative to the game being viewed.

Figure 6:
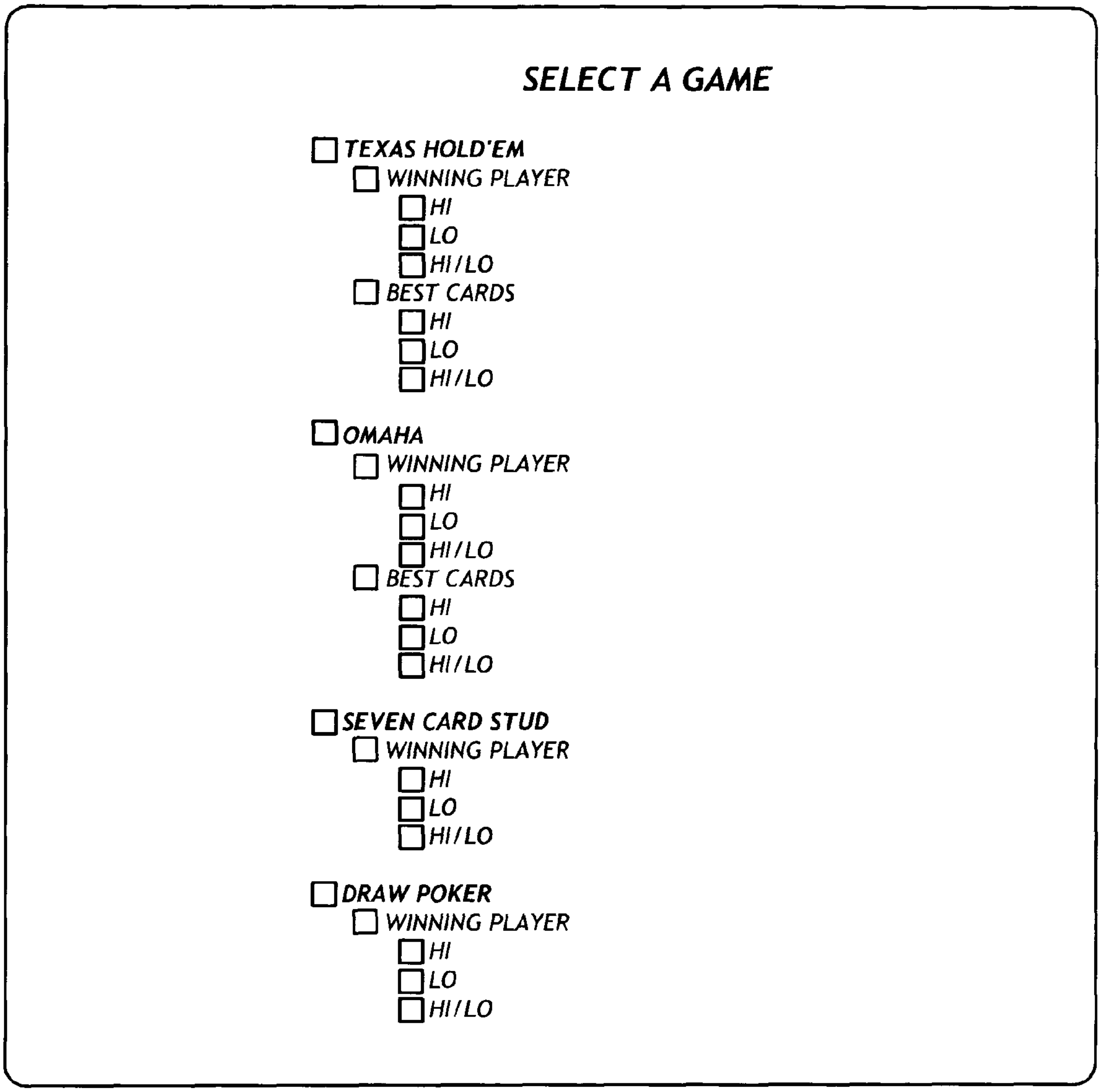
FIG. 6 discloses a screen for use with online playing system of the present invention that the online player will use to select the game that he wilt be viewing on the live broadcast.

Initially, the online player selects the type of game of interest. If the interest is poker, he may opt for Texas Hold'em, Omaha, seven-card stud, five-card draw, and a plurality of other games. If he selects Texas Hold'em FIG. 6 discloses a preferred embodiment of a menu that can be used. Once the online player selects the type of game, he is directed to a table, images of which are received on his television receiver. FIGS. 3A through 3G disclose various schematics of screens that can be used for viewing.

A new player will be directed to a basic screen image and schematic where he can select which player or players at the table will be the winning player for the next hand. Once he becomes more comfortable with the system, he can move to other screens.

The keypad can be a conventional computer keypad, or can be one specifically designed for the game (poker) as shown in FIGS. 1 through 9. Also, the keypad can be merged into the schematic and form a touch sensitive screen. In another preferred embodiment of the present invention, a handheld computer is used to enable viewing of the game and to participate online.

The player terminal displays images of the live or recorded game for view by an online player. The player terminal enables selection by the online player from any of participating players in the live or recorded game. The online player can select one or more of the participating players as to who will be the winning player of each hand in the live or recorded game. The online player can also select one or more of the participating players as to who will be dealt the best cards in the live or recorded game. The player terminal also enables the online player to enter value regarding each player selection for the live or recorded game. The use of the system of the present invention encourages the online player to select more than one player.

The first online player is provided with a plurality of playing options through the first player terminal. The plurality of playing options are in addition to the fold, call, check, or raise playing options for the plurality of participating players in the live or recorded game.

The online player can select which of the players at the table will win each round or hand. The online player can also select which of the live or recorded participating players will win a tournament, as well as show win, place, and show odds determined by the volume of the wagering on each of the participating live or recorded players. Generally, the more skillful players will win more often than the weaker players. The schematic of the table shows data of the amount of chips for each player at the table, which affects the probability of winning each hand. The players with the bigger stacks can often bluff players with smaller stacks. The probability is also affected by the position of the dealer, since a player has an advantage when he can see what other players at the table are doing before he makes his decision. The online player has access to the odds for each hand, which change with each hand, as the blinds rotate around the table.

In many poker games, and primarily games involving community cards, a determination can be made after the hand has been played, as to which player when using his blind plus the community cards, was dealt the best cards. A player can folder initially because of what appears to be a weak hand, but when all of the community cards are dealt, such player actually has the best cards. An online player can therefore select which player will be dealt the best cards. This is independent of the skill of any of the players at the table and independent of the winning hand. This is like betting on roulette or craps—the luck of the draw. Also, by enabling a best cards option, the poker game has many of the same aspects as a horserace, and the online poker player can select Trifectas, Quinielas, Perfectas, Superfectas and other types of exotic gaming to make the game more interesting. These same wagering options also apply to the final standings if the online player is wagering on tournament play. These options may also be used on other live or recorded play, with the wagering on record play being restricted.

The player terminal registers a winning selection whenever the player selection from the plurality of participating players is the winning player of the live or recorded game of the poker hand.

The player terminal registers a winning selection whenever the player selection from the plurality of participating players is dealt the best poker hand in the live or recorded game of the poker hand, said player selection being independent of the winning player of the live or recorded game.

Figure 7:
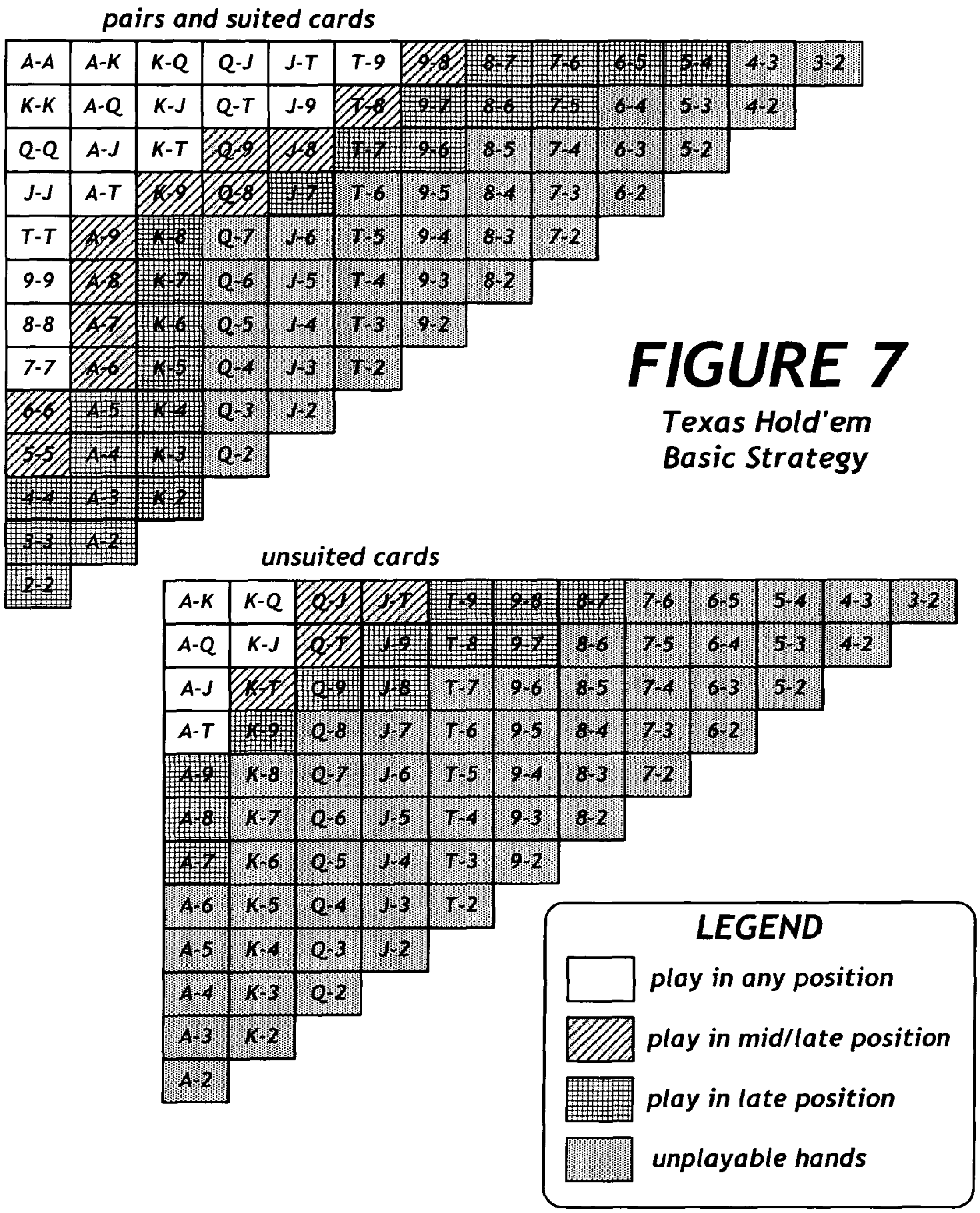
FIG. 7 discloses a preferred embodiment of a simplified basic strategy for Texas Hold'em using the online poker gaming system of the present invention, the basic strategy determining the gaming decisions of the players at the table.

FIG. 7 discloses a preferred embodiment of a simplified basic strategy for Texas Hold'em using the online poker gaming system of the present invention, the basic strategy determining the gaming decisions of the players at the table. In this embodiment, the players at the table are committed to playing basic strategy. While opinions differ as to correct play, such play is determined beforehand. Then, each player at the table is committed to play his cards consistent with such strategy. This embodiment works best when there is a limit to each round of betting. This also works as a learning device, for training new players.

In copending U.S. patent application Ser. No. 10/930,246 (Black), an off-site player by use of a key-card or other credit medium for quality play at a casino game, at any time, and from any location. The system enables the off-site player to select any player in the casino and wager on the outcome of the on-site player play from a remote location. In addition, in games such as craps and roulette, the off-site player has the option of wagering on the selected player or placing a direct wager on the outcome of the next gaming unit. The system includes a live gaming site, a data capture device and a gaming processor for enabling play from an off-site terminal.

Throughout this application, various Patents and Patent Applications are referenced by patent number and inventor. The disclosures of these Patents and Applications in their entireties are hereby incorporated by reference into this specification in order to more fully describe the state of the art to which this invention pertains.

Furthermore, it is evident that many other alternatives, modifications, and variations of the online gaming system of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

The invention claimed is:

1. A gaming system comprising:

a. a live or recorded game of poker involving a plurality of participating players, such plurality of participating players being positioned about a poker table, such plurality of participating players having fold, check, call, or raise playing options for the live or recorded game of poker, such plurality of participating players using gaming skills to be the winning player of the live or recorded game; and b. a first player terminal displaying images relative to the live or recorded game for view by a first online player, the first player terminal enabling player selection by the first online player from the plurality of participating players as to the winning player of the live or recorded game, the first player terminal enabling an entering of value selection by the first on line player regarding the one of the participating players selected for the live or recorded game;

whereby the first online player is provided with a plurality of playing options through the first player terminal, the plurality of playing options being in addition to the fold, call, check, or raise playing options for the plurality of participating players in the live or recorded game; and whereby the first online player makes a winning selection whenever such player selection from the plurality of participating players is the winning player of the live or recorded game of the poker hand.

2. The gaming system of claim 1, further comprising a second player terminal displaying images relative to the live or recorded game for view by a second on line player, the second player terminal enabling player selection by the second online player from the plurality of participating players as to the winning player of the live or recorded game, the second player terminal enabling value selection by the second online player to enter value regarding such player selection for the live or recorded game, whereby value selection by the first online player and value selection by the second online player are added together during play of the multiple live or recorded game, either the first or the second on line player winning a portion of the totaled value selections added together, such portion increasing with increased online playing activity.

3. The gaming system of claim 1, wherein value is awarded to the first online player by selecting a winning poker hand for the winning player, the value being determined by likelihood of being dealt the poker hand.

4. The gaming system of claim 1, wherein the first player terminal provides historical data of winning players of the live or recorded game, such historical data including success rates of the participating players for most recent of the live or recorded game of poker, lifetime earnings of participating players, and heads-up success against other participating players.

5. The gaming system of claim 1, wherein the first player terminal enables player selection by the first online player from the plurality of participating players as to the winning player of the live or recorded game, the first player terminal enabling value selection by the first online player to enter value regarding such player selection for the live or recorded game, the first online player making a winning selection whenever such player selection from the plurality of participating players is dealt the best poker hand in the live or recorded game of the poker hand, said best-poker-hand player being independent of the winning player of the live or recorded game.

6. A gaming system comprising:

a. a live or recorded game of poker involving a plurality of participating players, such plurality of participating players being positioned about a poker table; such plurality of participating players having fold, call, check, or raise playing options for the live or recorded game of poker, such plurality of participating players using gaming skills to be the winning player of the live or recorded game; and b. a first player terminal displaying images relative to the live or recorded game for view by a first online player, the first player terminal enabling player selection by the first online player from the plurality of participating players as to a winning player of the live or recorded game, the first player terminal enabling an entering of value selection by the first online player to enter value regarding the one of the participating players selected for the live or recorded game;

whereby the first player terminal provides the first online player with a plurality of playing options, the plurality of playing options being in addition to the fold, call, check, or raise playing options for the plurality of participating players in the live or recorded game; and whereby the first online player makes a winning selection whenever the player selection from the plurality of participating players is dealt the best poker hand in the live or recorded game of the poker hand, said best-poker-hand player being independent of the winning player of the live or recorded game.

7. The gaming system of claim 6, further comprising a second player terminal displaying images relative to the live or recorded game for view by a second online player, the second player terminal enabling player selection by the second online player from the plurality of participating players as to the winning player of the live or recorded game, the second player terminal enabling value selection by the second online player to enter value regarding such player selection for the live or recorded game, whereby value selection by the first online player and value selection by the second online player are added together during play of the multiple live or recorded game, either the first or the second online player winning a portion of the totaled value selections added together, such portion increasing with increased online playing activity.

8. The gaming system of claim 6, wherein value is awarded to the first online player by selecting a winning poker hand for the winning player, the value being determined by likelihood of being dealt the poker hand.

9. The gaming system of claim 6, wherein the first player terminal provides historical data of winning players of the live or recorded game, such historical data including success rates of the participating players for most recent of the live or recorded game of poker, lifetime earnings of participating players, and heads-up success against other participating players.

10. The gaming system of claim 6, wherein the first player terminal enables player selection by the first online player from the plurality of participating players as to the winning player of the live or recorded game, the first player terminal enabling value selection by the first online player to enter value regarding such player selection for the live or recorded game, the first online player making a winning selection whenever such player selection from the plurality of participating players is the winning player of the live or recorded game of the poker hand.

11. A gaming system comprising:

a. multiple live or recorded games of poker involving a plurality of participating players, such plurality of participating players being positioned about a poker table, such plurality of participating players having fold, call, check, or raise playing options for each live or recorded game of poker, such plurality of participating players using gaming skills to be the winning player in the multiple live or recorded games;

b. a first player terminal displaying images relative to one of the multiple live or recorded games for view by a first online player, the first player terminal providing the first online player with a plurality of playing options, the plurality of playing options being in addition to the fold, call, check, or raise playing options for the plurality of participating players in the live or recorded game, the first player terminal enabling selection of one of the participating players, the first player terminal enabling a value selection by the first online player to enter value regarding the one of the participating players selected for each of the live or recorded games; and c. a second player terminal displaying images relative to one of the multiple live or recorded games for view by a second online player, the second player terminal providing the second online player with a plurality of playing options, the plurality of playing options being in addition to the fold, call, check, or raise playing options for the plurality of participating players in the live or recorded game, the second player terminal enabling value selection by the second online player to enter value regarding the player selection for each of the live or recorded games;

whereby value selection by the first online player and value selection by the second online player are added together during play of the multiple live or recorded games, either the first or the second online player winning a portion of the value selection by the first online player and value selection by the second online player, such portion increasing with increased online playing activity.

12. The gaming system of claim 11, wherein value is awarded to the first online player by selecting a winning poker hand for the winning player, the value being determined by likelihood of being dealt the poker hand.

13. The gaming system of claim 11, wherein the first player terminal enables player selection by the first online player from the plurality of participating players as to the winning player of one of the multiple live or recorded games, the first player terminal enabling value selection by the first online player to enter value regarding such player selection for one of the multiple live or recorded games, the first online player making a winning selection whenever such player selection from the plurality of participating players is the winning player of the one of the multiple live or recorded games of the poker hand.

14. The gaming system of claim 11, wherein the first player terminal enables player selection by the first online player from the plurality of participating players as to the winning player of the one of the multiple live or recorded games, the first player terminal enabling value selection by the first online player to enter value regarding such player selection for the one of the multiple live or recorded games, the first online player making a winning selection whenever such player selection from the plurality of participating players is dealt the best poker hand in the one of the multiple live or recorded games, said best-poker-hand player being independent of the winning player of the one of the multiple live or recorded games.

* * * * *